United States Patent
Mese et al.

(10) Patent No.: US 10,620,437 B2
(45) Date of Patent: Apr. 14, 2020

(54) SYSTEMS AND METHODS FOR PRESENTATION OF IMAGES FROM CAMERA CONCURRENTLY WITH PRESENTATION OF VIRTUAL REALITY CONTENT

(71) Applicant: Lenovo (Singapore) Pte. Ltd., New Tech Park (SG)

(72) Inventors: John Carl Mese, Cary, NC (US); Arnold S. Weksler, Raleigh, NC (US); Nathan J. Peterson, Oxford, NC (US); Russell Speight Vanblon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 438 days.

(21) Appl. No.: 15/164,045

(22) Filed: May 25, 2016

(65) Prior Publication Data

US 2017/0343811 A1    Nov. 30, 2017

(51) Int. Cl.
*G02B 27/01*      (2006.01)
*G06T 19/00*      (2011.01)

(52) U.S. Cl.
CPC ....... *G02B 27/0172* (2013.01); *G02B 27/017* (2013.01); *G06T 19/006* (2013.01); *G02B 2027/014* (2013.01); *G02B 2027/0134* (2013.01); *G02B 2027/0138* (2013.01)

(58) Field of Classification Search
CPC ........ G02B 27/0172; G02B 2027/0138; G02B 2027/014; G06T 19/006; G06F 3/005
USPC ........................................................... 345/8
See application file for complete search history.

(56) References Cited

U.S. PATENT DOCUMENTS

| | | | |
|---|---|---|---|
| 2010/0079356 A1* | 4/2010 | Hoellwarth | G02B 27/017 345/8 |
| 2011/0209099 A1* | 8/2011 | Hinckley | G06F 3/0483 715/863 |
| 2016/0041614 A1* | 2/2016 | Mok | G06F 3/013 345/156 |
| 2017/0068380 A1* | 3/2017 | Hong | G06F 3/0482 |
| 2017/0162177 A1 | 6/2017 | Lebeck et al. | |
| 2017/0323485 A1 | 11/2017 | Samec et al. | |
| 2017/0343811 A1 | 11/2017 | Mese et al. | |

OTHER PUBLICATIONS

Rachel Metz, "How to Avoid Real Objects While in a Virtual World", Jun. 12, 2015. https://www.technologyreview.com/s/538336/how-to-avoid-real-objects-while-in-a-virtual-world/.

(Continued)

*Primary Examiner* — Stephen G Sherman
(74) *Attorney, Agent, or Firm* — John M. Rogitz; John L. Rogitz

(57) ABSTRACT

In one aspect, a headset includes a housing, a processor coupled to the housing, a display coupled to the housing and accessible to the processor, a camera coupled to the housing and accessible to the processor, and storage coupled to the housing and accessible to the processor. The storage bears instructions executable by the processor to present virtual reality content on the display and present at least a portion of least one image from the camera on the display concurrently with presentation of the virtual reality content.

17 Claims, 6 Drawing Sheets

(56) References Cited

OTHER PUBLICATIONS

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related pending U.S. Appl. No. 15/660,176, filed Jul. 26, 2017.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related U.S. Appl. No. 15/660,176, Non-Final Office Action dated Aug. 2, 2018.

Ming Qian, John Weldon Nicholson, Song Wang, Jatinder Kumar, David Alexander Schwarz, "Presentation of Augmented Reality Images at Display Locations that do Not Obstruct User's View", file history of related U.S. Appl. No. 16/018,351, filed Jun. 26, 2018.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related pending U.S. Appl. No. 15/660,176, final office action dated May 9, 2018.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related pending U.S. Appl. No. 15/660,176, applicant's response to final office action filed Jul. 3, 2018.

Robert James Kapinos, Timothy Winthrop Kingsbury, Russell Speight Vanblon, Scott Wentao Li, Jonathan Gaither Knox, Arnold S. Weksler, John Carl Mese, Nathan J. Peterson, "Systems and Methods to Alter Presentation of Virtual Rendition Based on Real World Object", related U.S. Appl. No. 15/660,176, Applicant's response to Non-Final Office Action filed Mar. 20, 2018.

* cited by examiner

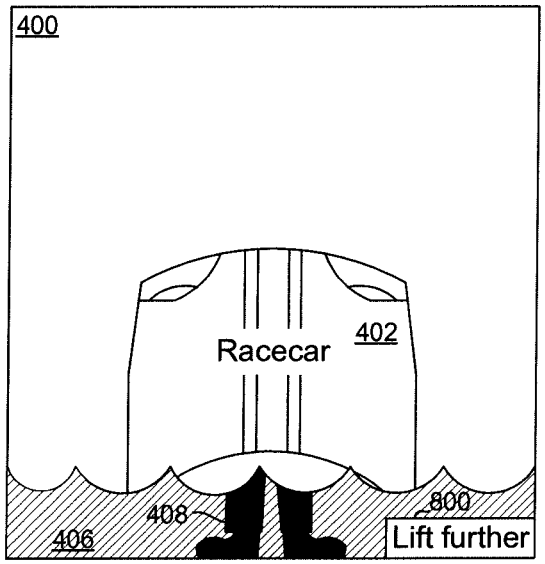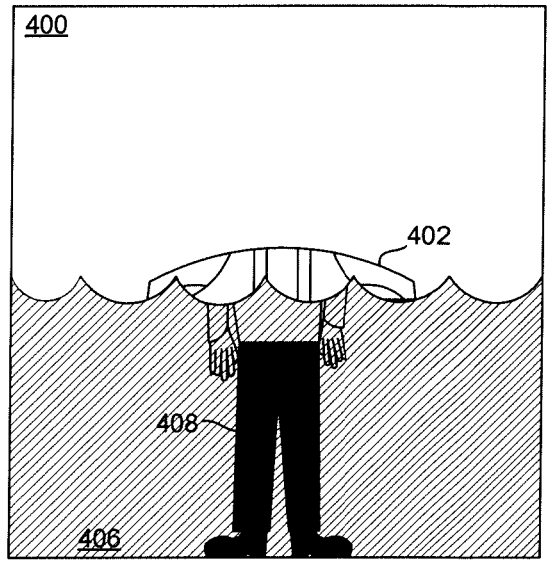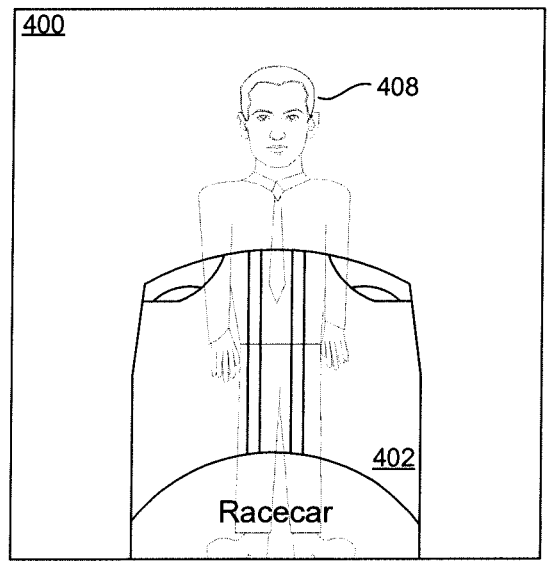

SYSTEMS AND METHODS FOR PRESENTATION OF IMAGES FROM CAMERA CONCURRENTLY WITH PRESENTATION OF VIRTUAL REALITY CONTENT

FIELD

The present application relates generally to systems and methods for presentation of images from a camera concurrently with presentation of virtual reality content.

BACKGROUND

As recognized herein, virtual reality systems are becoming increasingly prevalent in the marketplace and provide ways for users to immerse themselves in virtual worlds. However, as also recognized herein, these systems do not keep users adequately aware of relevant items in their real-world surroundings while immersed in virtual worlds owing to their inability, while wearing a virtual reality system, to see real-world objects. For example, a user that engages in a virtual reality game requiring physical movement on the part of the user may not be aware that the user's movement while playing the virtual reality game has brought them close to a wall that they may ultimately bump into while playing the virtual reality game.

SUMMARY

Accordingly, in one aspect a headset includes a housing, a processor coupled to the housing, a display coupled to the housing and accessible to the processor, a camera coupled to the housing and accessible to the processor, and storage coupled to the housing and accessible to the processor. The storage bears instructions executable by the processor to present virtual reality content on the display and present at least a portion of least one image from the camera on the display concurrently with presentation of the virtual reality content.

In another aspect, a method includes presenting content on a display of a headset that presents at least one of augmented reality (AR) content and virtual reality (VR) content and presenting at least a portion of least one image on the display concurrently with presenting the content.

In still another aspect, a computer readable storage medium that is not a transitory signal comprises instructions executable by a processor to present content on a display of a headset that presents at least one of augmented reality (AR) content and virtual reality (VR) content. The instructions are also executable by the processor to present at least a portion of least one image from a camera on the display concurrently with presentation of the content, where the camera is coupled to the headset.

In yet another aspect, a headset includes a housing, a processor coupled to the housing, a display coupled to the housing and accessible to the processor, a camera coupled to the housing and accessible to the processor, and storage coupled to the housing and accessible to the processor. The storage bears instructions executable by the processor to present virtual reality content on the display and present at least a portion of least one image from the camera on the display transparently and concurrently with presentation of the virtual reality content.

The details of present principles, both as to their structure and operation, can best be understood in reference to the accompanying drawings, in which like reference numerals refer to like parts, and in which:

BRIEF DESCRIPTION OF THE DRAWINGS

FIGS. 4-6 and 8-10 show examples of VR content and camera image presentation formats in accordance with present principles;

DETAILED DESCRIPTION

Figure 1:
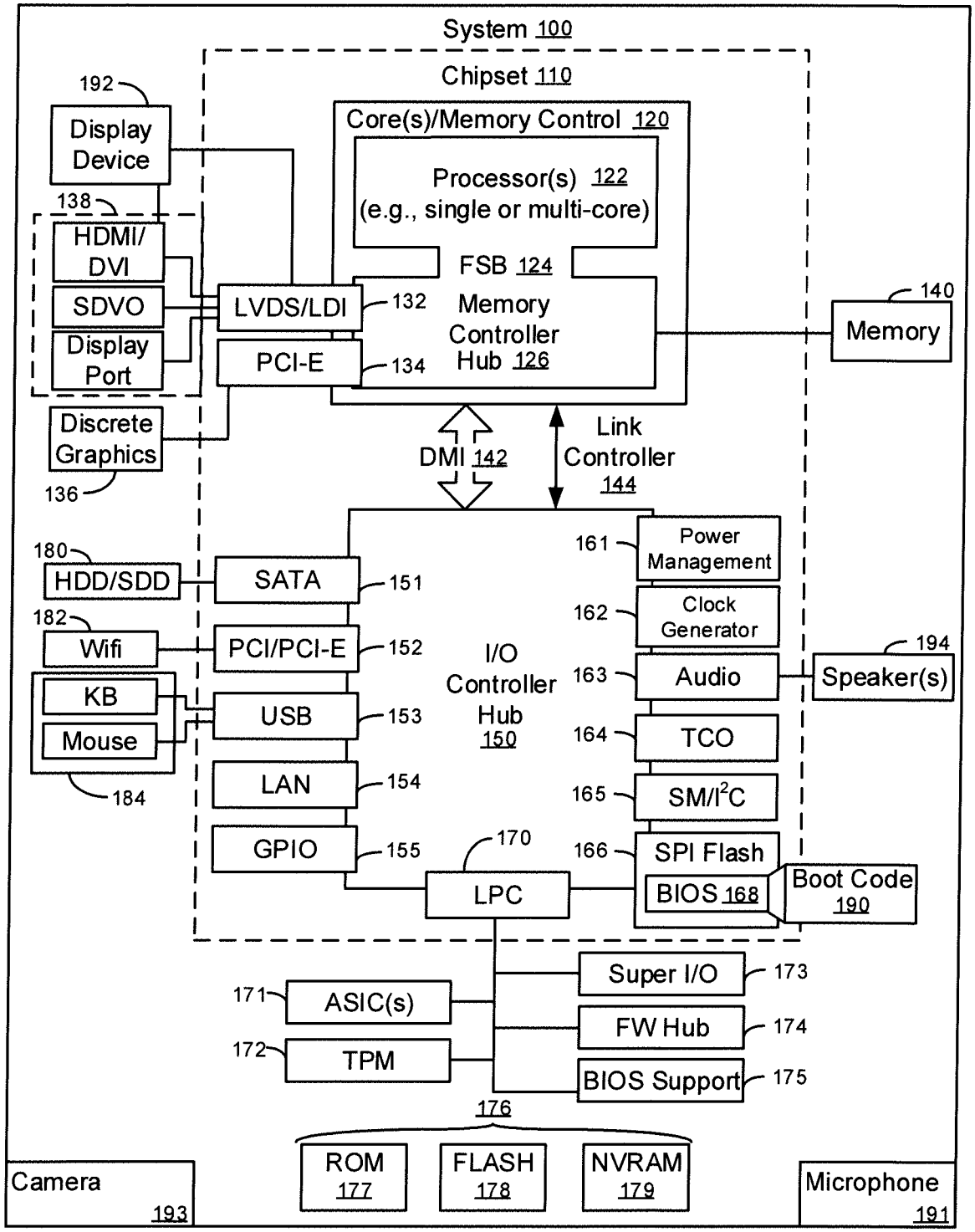
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Even further, the system 100 may include an audio receiver/microphone 191 that provides input from the microphone to the processor 122 based on audio that is detected, such as via a user providing audible input to the microphone 191. The system 100 may also include a camera 193 that gathers one or more images and provides input related thereto to the processor 122. The camera 193 may be a thermal imaging camera, a digital camera such as a webcam, a three-dimensional (3D) camera, and/or a camera otherwise integrated into the system 100 and controllable by the processor 122 to gather pictures/images and/or video.

Additionally, though not shown for clarity, in some embodiments the system 100 may include a gyroscope that senses and/or measures the orientation of the system 100 and provides input related thereto to the processor 122, and an accelerometer that senses acceleration and/or movement of the system 100 and provides input related thereto to the processor 122. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
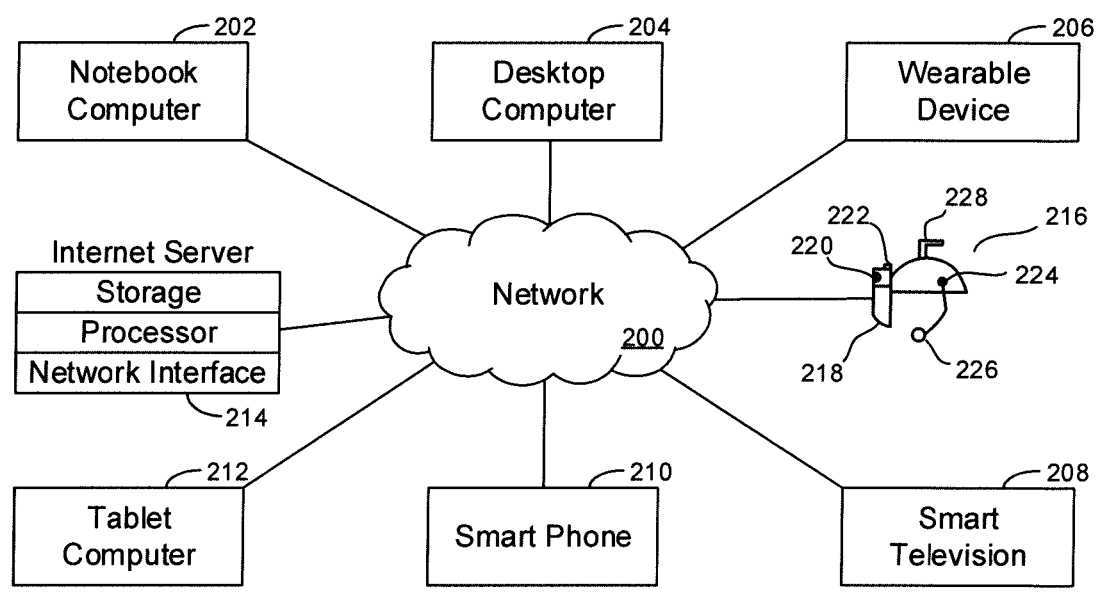
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 are configured to communicate with each other over the network 200 to undertake present principles.

Describing the headset 216 in more detail, it may include a display device 218 for presenting virtual reality (VR) and/or augmented reality (AR) content, a camera 220 that may be similar in function and configuration to the camera 193, a button 222 that may be touch-enabled and/or depressible to provide input to a processor on the headset 216 as will be described further below, a microphone 224 that may be similar in function and configuration to the microphone 191, a speaker 226 that may be similar in function and configuration to the speaker(s) 194 and present audio sensed by the microphone 224, and one or more head-engagement members 228 for a user to dispose the headset 216 on his or her head.

Figure 3:
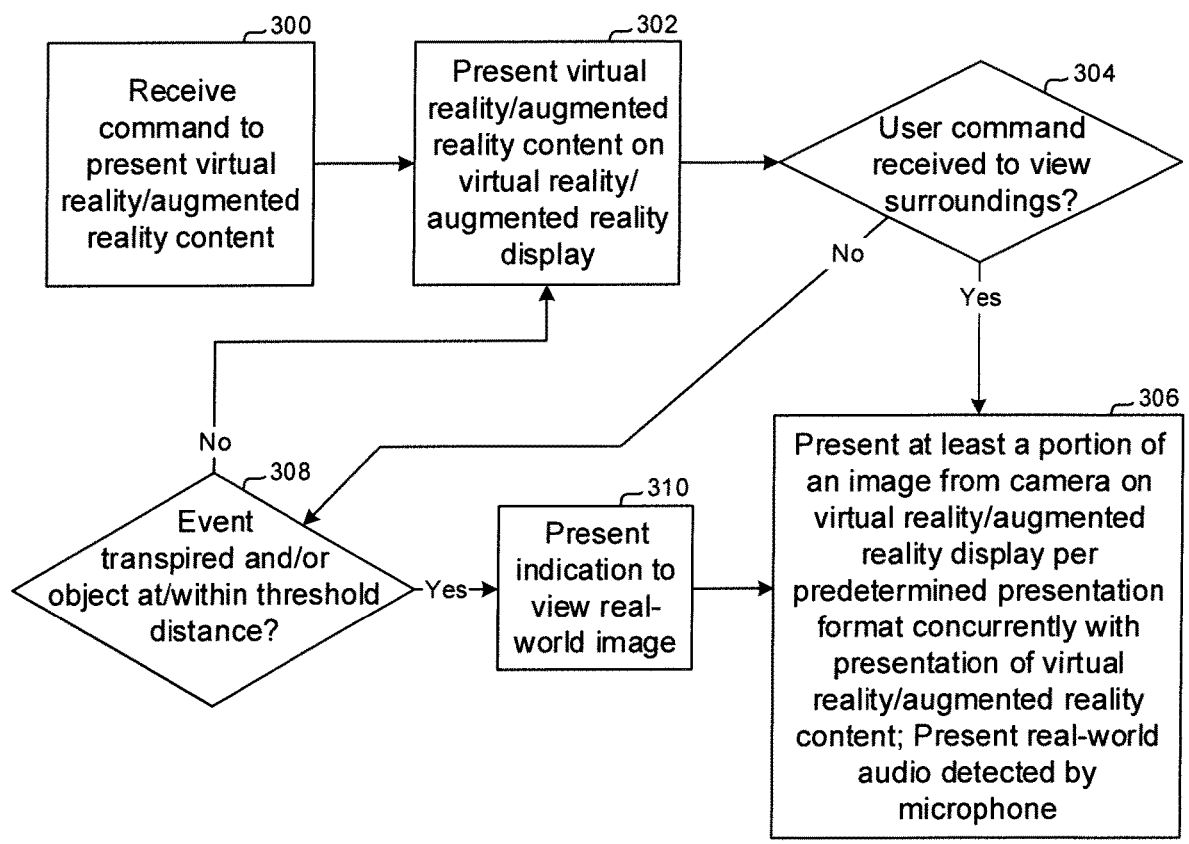
FIG. 3 is a flow chart of an example algorithm in accordance with present principles.

Referring to FIG. 3, it shows example logic that may be executed by a device such as the system 100 and/or a headset for presentation of images from a camera concurrently with presentation of virtual reality content in accordance with present principles. Beginning at block 300, the logic may receive a command to present virtual reality (VR) and/or augmented reality (AR) content at a VR/AR headset, such as a verbal or touch command from a user to begin presenting the VR and/or AR content (referred to below as "VR" content for simplicity). From block 300 the logic next moves to block 302 where the logic may, responsive to receipt of the command, present the VR content on a display(s) of the headset.

The logic of FIG. 3 then moves to block 304, where the logic may determine whether a user command has been received to view the user's surroundings while wearing the headset and/or whether a user command has been received to present images from one or more cameras on the headset facing a direction opposing a front-facing direction of the headset's display when worn correctly. Thus, it is to be understood that the camera(s) on the headset may face away from the user when the headset is worn and that images from the camera may provide a field of view similar to one the user would see with his or her own eyes had he or she not been wearing the headset. Accordingly, it is to be further understood that the headset, when worn, may partially or completely block the user's ability to see his or her real-world surroundings so that a user may immerse himself or herself in a virtual world based on computer-generated and/or virtual images being presented using the headset's display.

A user command as referenced in the paragraph above may be received based on user selection of a button on the headset, such as a button similar in function and configuration to the button 222 described above. The user command that is received may also be a predetermined voice command received via a microphone on the headset or elsewhere, and/or a predetermined gesture command received via a camera on the headset or elsewhere. Additionally or alternatively, the user command may be a user looking at a predetermined area and/or object for a threshold amount of time that is shown in a virtual world that is presented using the headset's display.

Responsive to an affirmative determination at diamond 304, the logic may move to block 306. At block 306 the logic may present at least a portion of an image from the headset's camera on the headset's display, and in some embodiments may present a real-time video feed from the camera. The portion may be presented according to a predetermined presentation format, such as a default format or one previously selected by a user, and/or may be presented at a predetermined area. Thus, the portion may be presented in the predetermined format and/or at the predetermined area concurrently with the headset also and/or still presenting the VR content on other portions of the display, with the predetermined area not presenting VR content while the predetermined area presents at least the portion of the image from the headset's camera.

Furthermore, in some embodiments, at block 306 and concurrently with presenting the at least on image from the headset's camera, the logic may present audio on at least one speaker accessible to the headset, such as a speaker in the same room as the user, left and right ear speakers of ear phones or ear buds being worn by the user, left and right ear speakers on the headset itself, etc. The audio that is presented may correspond to audio input sensed by a microphone on the headset or a microphone elsewhere in the user's environment. Thus, while the at least portion of the image is presented, audio corresponding to the same environment as the image may be concurrently presented so that a user can observe audio corresponding to and/or surrounding the field of view in the image itself. In some embodiments, while the audio from the environment is presented, VR audio content may not be presented even if VR video content is still presented on areas of the headset's display not presenting the image(s) from the camera. In other embodiments, while the audio from the environment is presented, VR audio content may also be concurrently presented.

Referring back to decision diamond 304, responsive to a negative determination thereat, the logic may instead move to decision diamond 308 rather than directly to block 306. At diamond 308 the logic may make one or more determinations for whether to present images from the headset's camera, such as a determination regarding whether an object (e.g., a wall or coffee table) is at a threshold distance to the headset, a determination regarding whether an object is at a threshold distance to a user, a determination regarding whether an object is within a threshold distance to the headset, and/or a determination regarding whether an object is within a threshold distance to a user.

Additionally or alternatively, at diamond 308 the logic may make a determination regarding whether a particular and/or predetermined event has transpired. For example, the headset sensing motion other than motion of the headset itself and user himself or herself (as may be detected based on input from a motion sensor and/or camera on the headset) may be a predetermined event for which it may be determined that images from the headset's camera should be presented on the headset's display. As another example, an event may be any person or animal, or a particular predetermined person/animal, being identified by the headset as present and/or within a threshold distance to the headset/user, such as by executing a facial recognition on images from the headset's outward-facing camera to identify the person.

As yet another example, an event may be that the user is receiving a telephone call, email, or text message, as may be identified based on input from the headset's microphone to identify audio associated with the telephone call, email, or text. An incoming telephone call, email, or text message may also be identified by the logic based on communication with an associated device at which the telephone call, email, or text message is being received.

Other audio events/audio event types may also be identified, e.g., based on communication with another device that is the source of the audio and/or identification of audio at the headset itself based on microphone input. For example, identification that a doorbell has been activated may result in an affirmative determination at diamond 308. Identification that an animal as making a noise, such as the user's dog barking, may also result in an affirmative determination at diamond 308. Identification that an inclement weather condition is occurring (e.g., identification of thunder) may also result in an affirmative determination at diamond 308.

Still further, identification that an alarm is occurring (e.g., an alarm on the user's smart phone, a smoke alarm, an inclement weather condition alert/alarm, etc.) may result in an affirmative determination at diamond 308. For example, based on audio that is detected at the headset, based on communication with a device presenting the audio, and/or based on visual identification of the event (e.g., using object or text recognition), an emergency weather alert presented audibly and/or visually using a television may be identified to thus result in an affirmative determination at diamond 308, which in turn would cause the logic to present images from the headset's camera so that the user can view the warning as presented at the television.

Other example events that may result in an affirmative determination at diamond 308 include a predetermined and/or user-specified time arriving, or a predetermined and/or user-specified piece of content being presented on another device (e.g., a television news program commencing or returning from a commercial break).

Furthermore, based on input from one or more biometric sensors engaged with the user, the logic may identify that a predetermined event related to the user is occurring, such as the user becoming disorientated, overly-excited (e.g., his or her pulse being unacceptably high), tired, confused, etc., which would also result in an affirmative determination at diamond 308 and which, as will be described further below, will then cause one or more images from the headset's camera to be presented on the headset's display. In this way, e.g., a user may re-orient himself or herself to his or her real-world surroundings, calm down by seeing his or her real-world surroundings, etc.

A negative determination at diamond 308 may cause the logic to revert back to block 302 and proceed therefrom.

In some embodiments, an affirmative determination at diamond 308 may cause the logic to proceed directly to block 306 and take actions thereat as described herein. However, in other embodiments, an affirmative determination at diamond 308 may first cause the logic to move to block 310. At block 310 the logic may, prior to presentation of the image(s) from the headset's camera on the headset's display but still concurrently with presentation of the virtual reality content, present an indication to view an image from the camera. The indication may be presented as text, as an audio indication (e.g., a chime or an automated voice), and/or as a visual effect such as a flash, ripple, or wave in the VR content and/or at a predetermined area of the display (such as at a lower portion of the display).

From block 310 the logic may then proceed to block 306 to take actions thereat as described herein. The logic may move from block 310 to block 306 based on a user command to present images from the camera, such as one of the commands described in reference to diamond 304 above. The logic may also move from block 310 to block 306 to automatically present one or more images from the headset's camera responsive to a threshold time being reached from when the indication was presented. The logic may also move from block 310 to block 306 responsive to a criterion being met or no longer being met.

Note that from block 306 the logic may end, or the logic may revert back to a previous step such as block 300 or block 302. For example, responsive to determining that an event has ended, responsive to determining that a criterion no longer applies (e.g., a user has moved outside of a threshold distance to an object), and/or responsive to receipt of a user command to cease presenting the image(s) from the camera, the logic may cease presenting images from the headset's camera and revert back to block 302 where the logic merely presents the VR content and proceeds therefrom.

Figure 5:
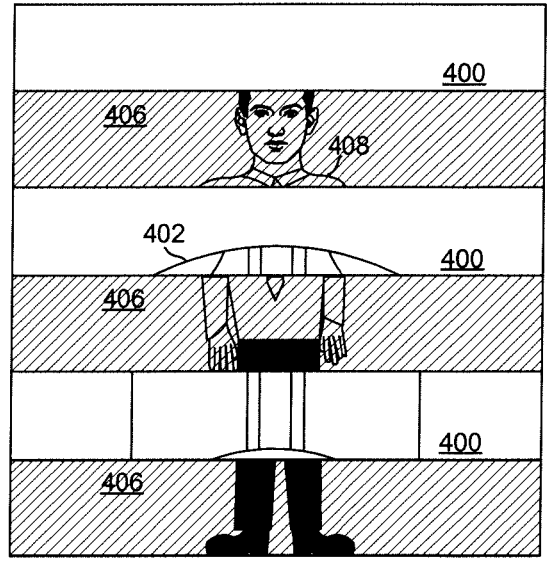
Figure 6:
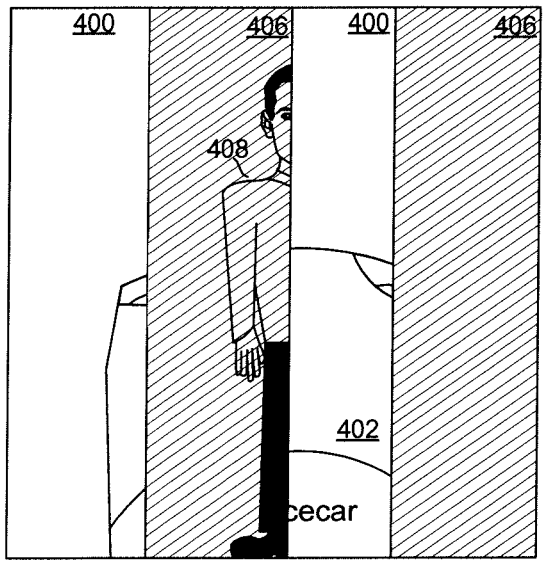
Figure 7:
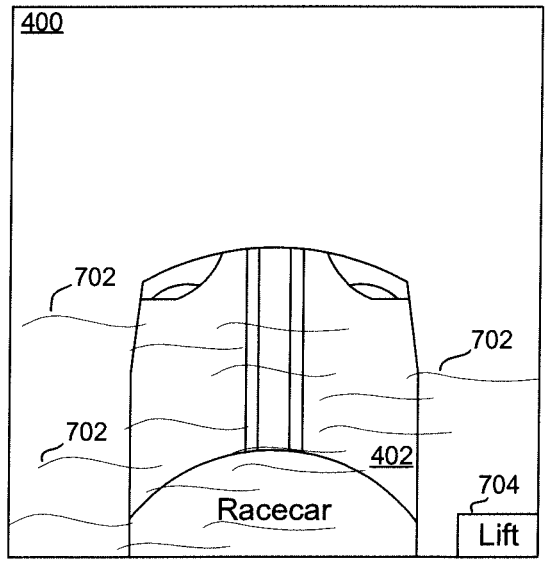
FIG. 7 shows an example of VR content with an example indication of a camera image to view being presented in accordance with present principles.

FIGS. 4-6 and 8-10 show various image presentation formats that may be used in accordance with present principles, while FIG. 7 shows an example indication that may be presented at block 310 as described above. It is to be understood that the image presentation formats and indication that are shown in these figures are represented in the figures as would be perceived by a user while wearing a VR/AR headset, and that two displays or two portions of a single display, one for each eye, may separately present content represented in these figures so that content may be perceived by a user as shown in these figures while the headset is worn.

Figure 4:
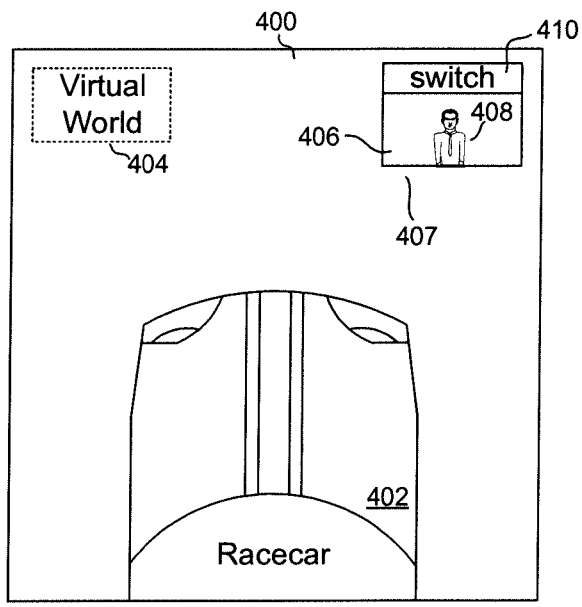

Beginning first with FIG. 4, virtual content 400 involving a race car game is presented, and hence a race car hood 402 from a first person driver perspective is shown. The virtual content 400 is also indicated via a "virtual world" indication 404 overlaid on the VR content 400, it being understood that the indication 404 may be overlaid on VR content in the other formats to be discussed below though omitted for simplicity.

In any case, as may be appreciated from FIG. 4, in this example the predetermined format is a picture-in-picture (PIP) format in which at least a portion, if not all, of an image 406 from a headset's camera is presented in a smaller window 407 relative to the area that presents the VR content 400 as shown. In the example shown, the window 407 is understood to show a real time video feed of a person 408 other than the user that has been sensed as moving to within what would otherwise be the field of view of the user if the user were not wearing the headset.

Also shown adjacent to the window 407 or as part of the window 407 is a selector 410. The selector 410 is selectable to automatically without further user input cause the VR content 400 and image 406 to switch so that the image 406 is presented in the area where the VR content 400 was presented (and hence, the image 406 is presented larger than when presented in the window 407) while the VR content 400 is presented in the window 407. The selector 410 may then be selected by a user to switch back as well. Selection of the selector 410 may be via a gesture command and/or a verbal command. Selection of the selector 410 may also be performed based on the user looking at the selector 410 for a predetermined amount of time, such as may be determined using eye tracking software to track the user's gaze at the headset's display(s) based on input from one or more other cameras on the headset facing inward toward the user's eyes to gather images of them.

FIG. 5 shows another example predetermined format that may be used in accordance with present principles, with the format shown in FIG. 5 presenting various respective portions of, but not all of, the VR content 400 and real-world image(s) 406 in various horizontally-separated and/or horizontally-oriented segments. The segments may be established as respective horizontal slats or slits. Additionally or alternatively, the horizontal segments may be presented to collectively resemble a horizontal window blinds layout (e.g., Venetian blinds).

FIG. 6 shows yet another example predetermined format that may be used in accordance with present principles, with the format shown in FIG. 6 presenting various respective portions of, but not all of, the VR content 400 and real-world image(s) 406 in various vertically-separated and/or vertically-oriented segments. The segments may be established as respective vertical slats or slits. Additionally or alternatively, the vertical segments may be presented to collectively resemble a vertical window blinds layout.

Moving on to the description of FIG. 7, it shows an example indication that may be presented on the VR content 400 as described herein, it being noted that the image(s) 406 are not shown in FIG. 7. FIG. 7 shows an example indication presented as ripples or waves 702 in a lower portion of the VR content 400. FIG. 7 also shows that a selector 704 may be overlaid on or presented in the VR content 400, which may be selected by a user via selection of a button, a gesture command, a voice command, looking at the selector 704 for a predetermined amount of time, etc. The selector 704 may be selectable to automatically without further user input cause the headset to present a predetermined format in accordance with present principles for presenting both the VR content 400 and image(s) 406, such as the example predetermined format shown in FIG. 8.

FIG. 8 shows an example predetermined format that simulates a virtual content theater curtain lifting and/or a roll-back of the VR content 400 to progressively reveal, from a bottom edge of the headset's display, the image(s) 406 on a lower area of the headset's display concurrently with presentation of the VR content 400. Using the format shown in FIG. 8, a user may view a portion of the image(s) 406 while the VR content 400 is still presented on a majority of the area of the display on which images are presentable, such as on the represented theater curtain/screen itself that is being virtually lifted to reveal the real-world image(s).

FIG. 8 also shows that a selector 800 may be overlaid on or presented in the image(s) 406 (though in some embodiments it may be overlaid on or presented in the VR content 400). The selector 800 may be selected by a user via selection of a button, a gesture command, a voice command, looking at the selector 800 for a predetermined amount of time, etc. The selector 800 may be selectable to automatically without further user input cause the headset to further "lift the curtain" of the VR content 400 and/or otherwise present a representation of the VR content 400 being further rolled up and/or rolled back to thus reveal more of the image 406, as shown in FIG. 9.

Note that while in some embodiments either of the format variations shown in FIGS. 8 and 9 may be presented based on respective selection of the selectors 704 and 800 described above and/or subsequent to presentation of the indication(s) 702, in other embodiments these format variations may be presented without the selectors 704 and 800 being selected and/or indication(s) 702 presented, such as based on a user command as described above in reference to diamond 304 and/or automatically responsive to one of the determinations discussed herein.

FIG. 10 shows another example predetermined format that may be used in accordance with present principles, with the format shown in FIG. 10 presenting the VR content 400 while concurrently presenting the image(s) 406 as a transparent overlay or underlay on the VR content 400 as represented by the perforated outlines of objects in the image(s) 406. In some embodiments the entire image(s) 406 may be presented transparently over or under the VR content 400, while in other embodiments particular objects may be recognized and separated from the image(s) 406 to then be presented (e.g., but not a background of the image(s) 406).

Figure 11:
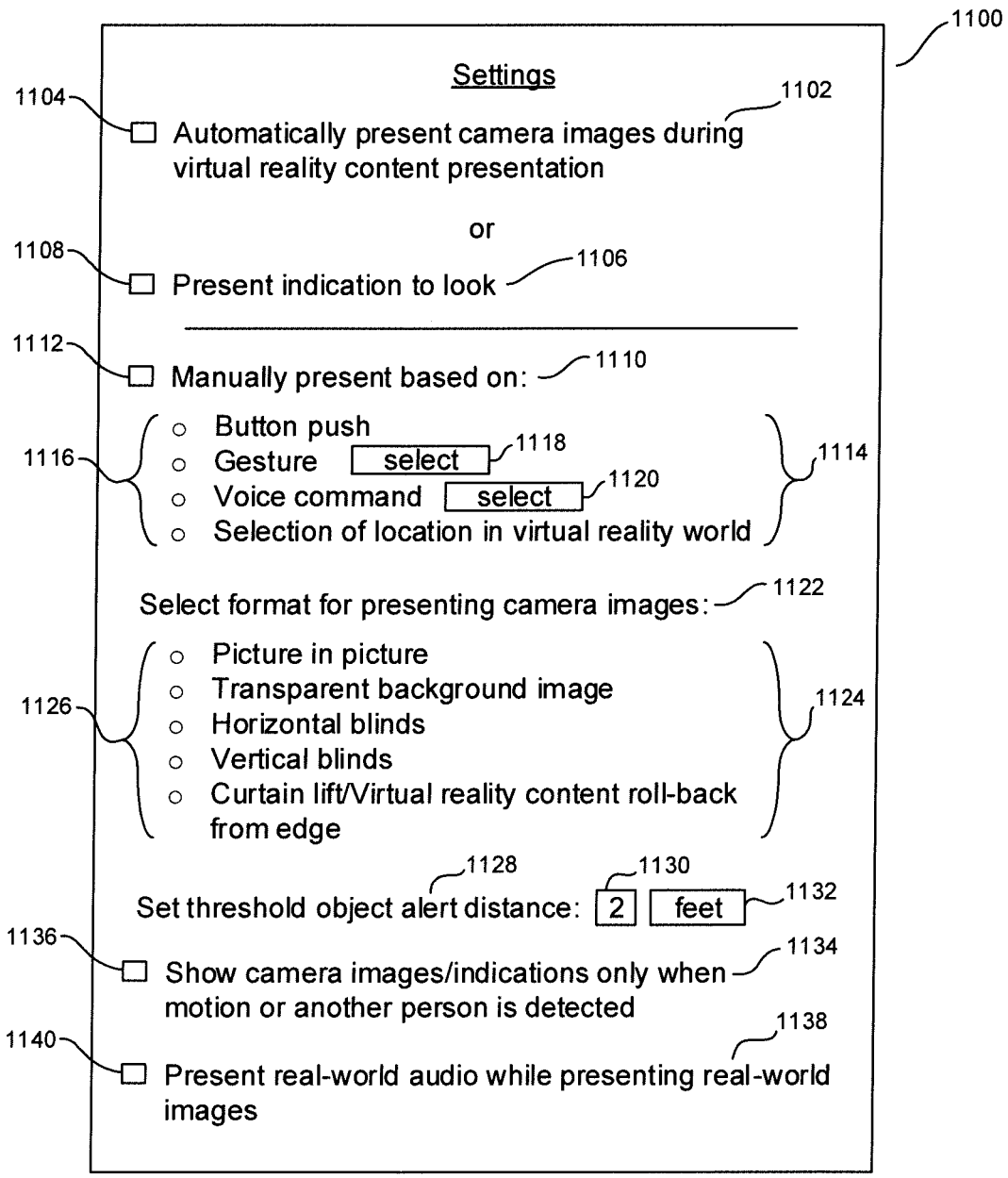
FIG. 11 is an example user interface (UI) in accordance with present principles.

Continuing the detailed description in reference to FIG. 11, it shows an example user interface (UI) 1100 that may be presented on a headset's display or on a display of another device in communication with the headset (such as a user's smart phone, a video game console, a television, etc.). In either case, it is to be understood that the UI 1100 is for configuring settings for presentation of both VR/AR content and images from the headset's camera in accordance with present principles. The UI 1100 may include a first option 1102 enableable using check box 1104 to configure the headset (and/or another device controlling the headset's display) to automatically present images from a camera during presentation of VR/AR content in accordance with present principles (e.g., such as based on one or more of the determinations discussed in reference to diamond 308). The UI 1100 may also include a second option 1106 enableable using check box 1108 to alternatively present an indication first in accordance with present principles, such as the indication described above in reference to block 310 and/or the indication(s) 702 also described above.

The UI 1100 may also include an option 1110 enableable using check box 1112 to, in addition to or in lieu of one of automatically presenting camera images or presenting indications first, allow for a user to "manually" invoke presentation of images from the camera by providing a command to do so as discussed herein. In some embodiments, sub-options 1114 respectively enableable using respective radio buttons 1116 adjacent to each sub-option 1114 may be selected to "manually" invoke presentation of images from the camera using one or more particular types of commands. Example command types include button selections, gesture commands, voice commands, and "selections" of locations or selectors in a VR/AR world by looking at the locations/selectors for at least a threshold time. Note that respective "select" selectors 1118 and 1120 may also be presented for respectively indicating or preselecting one or more respective, particular gestures or voice commands for the device to identify to then present images from the headset's camera (e.g., using another UI presented responsive to selection of one of the selectors 1118, 1120).

Still in reference to FIG. 11, the UI 1100 may also include an option 1122 for a user to select a format for presenting camera images with VR/AR content in accordance with present principles. Thus, various formats 1124 are listed on the UI 1100 and are respectively selectable using one of the respective check boxes 1126 adjacent to each format listed. As may be appreciated from FIG. 11, the example formats 1124 listed are a picture-in-picture format, a transparent image format, a horizontal blinds format, a vertical blinds format, and a format simulating a curtain lift/VR content roll-back from an edge of a display at which some of the VR content was being presented.

Even further, the UI 1100 may include an option 1128 to set or establish a threshold distance for the device to use so that when an object is identified as at and/or within the threshold distance, an indication (such as the one described in reference to block 310) may be presented or an image may be presented (e.g., depending on which of the options 1102 and 1106 is enabled). Thus, a number entry box 1130 is shown for inputting a number, and an increment entry box 1132 is also shown for inputting a distance increment to correspond to the number input to box 1130. In the example shown, a user has entered two feet as the threshold distance.

In some embodiments, the UI 1100 may also include an option 1134 enableable using check box 1136 to configure the device to show images from the camera and/or indications only when motion is detected or another person is detected as being proximate to or within a threshold distance of the user/headset. The UI 1100 may also include an option 1138 enableable using check box 1140 to configure the device to present real-world audio as disclosed herein while also presenting real-world images from the camera.

In accordance with present principles, it is to be understood that while images from cameras on a headset have been referenced above, such as cameras facing away from the headset in a front-facing direction, images from cameras facing other directions may be presented. Even further, in some embodiments images from cameras not on the headset may be presented.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein.

What is claimed is:

1. A headset, comprising:
   a housing;
   a processor coupled to the housing;
   a display coupled to the housing and accessible to the processor;
   a camera coupled to the housing and accessible to the processor; and
   storage coupled to the housing and accessible to the processor, the storage bearing instructions executable by the processor to:
   present virtual reality content on the display;
   present at least a portion of least one image from the camera on the display concurrently with presentation of the virtual reality content; and
   prior to presentation of the portion on the display but still concurrently with presentation of the virtual reality content, present an indication to view an image.

2. The headset of claim 1, wherein the instructions are executable by the processor to:
   present a first portion but not a second portion of least one image from the camera on the display concurrently with presentation of the virtual reality content.

3. The headset of claim 1, wherein the instructions are executable by the processor to:
   present the portion on a predetermined area of the display concurrently with presentation of the virtual reality content.

4. The headset of claim 3, wherein the predetermined area does not present virtual reality content for at least part of the time the predetermined area presents the portion.

5. The headset of claim 1, wherein the instructions are executable by the processor to:
   responsive to receipt of a command from a user to at least one of view the user's surroundings and present images from the camera, present the portion on the display concurrently with presentation of the virtual reality content.

6. The headset of claim 1, wherein the instructions are executable by the processor to:
   responsive to a determination, present the portion on the display concurrently with presentation of the virtual reality content.

7. The headset of claim 6, wherein the determination comprises one or more of: a determination that an object is at a threshold distance to the headset, a determination than an object is at a threshold distance to a user, a determination that an object is within a threshold distance to the headset, a determination that an object is within a threshold distance to a user, a determination that an event has transpired.

8. The headset of claim 1, wherein the instructions are executable by the processor to:
present the portion on the display in picture-in-picture format concurrently with presentation of the virtual reality content.

9. The headset of claim 1, wherein the instructions are executable by the processor to:
present the portion on the display in horizontal blinds format concurrently with presentation of the virtual reality content.

10. The headset of claim 1, wherein the instructions are executable by the processor to:
present the portion on the display in vertical blinds format concurrently with presentation of the virtual reality content.

11. The headset of claim 1, wherein the instructions are executable by the processor to:
present the portion on a lower area of the display concurrently with presentation of the virtual reality content by simulating a virtual content lifting to reveal the portion.

12. The headset of claim 1, wherein the instructions are executable by the processor to:
present the portion on the display transparently and concurrently with presentation of the virtual reality content.

13. A method, comprising:
presenting virtual reality (VR) content on a display of a headset; and
presenting at least a portion of at least one image on the display concurrently with presenting the VR content by presenting the portion on the display in a vertical slat format concurrently with presenting the VR content.

14. The method of claim 13, wherein the portion of the at least one image is presented in the vertical slat format at a first time, and wherein the method comprises:
presenting, at a second time different from the first time, the portion on the display in a horizontal slat format concurrently with presenting the VR content.

15. The method of claim 13, wherein the portion of the at least one image is presented in the vertical slat format at a first time, and wherein the method comprises:
presenting, at a second time different from the first time, the portion on the display concurrently with presenting the VR content by simulating a roll-back of the VR content to reveal the portion.

16. A computer readable storage medium that is not a transitory signal, the computer readable storage medium comprising instructions executable by a processor to:
present virtual reality (VR) content on a display of a headset; and
present at least a portion of least one image from a camera on the display concurrently with presentation of the VR content by one or more of: presenting the portion on the display in a horizontal slit format, presenting the portion on the display in a vertical slit format, and presenting the portion on the display by simulating a revelation of the VR content from an edge of a part of the display that presents images, the camera coupled to the headset.

17. The computer readable storage medium of claim 16, wherein the instructions are executable by the processor to:
concurrently with presentation of the portion on the display, present audio on at least one speaker, wherein the audio is presented based at least in part on input from a microphone.

* * * * *